United States Patent [19]

Okada

[11] Patent Number: 5,094,077

[45] Date of Patent: Mar. 10, 1992

[54] HYDROSTATIC TRANSMISSION WITH INTERCONNECTED SWASH PLATE NEUTRAL VALVE AND BRAKE UNIT

[75] Inventor: Hideaki Okada, Takarazuka, Japan

[73] Assignee: Kanzaki Kokyukoki, Mfg., Co., Ltd., Amagasaki, Japan

[21] Appl. No.: 551,137

[22] Filed: Jul. 11, 1990

[30] Foreign Application Priority Data

Jul. 12, 1989 [JP] Japan .................. 1-81794[U]

[51] Int. Cl.⁵ ............................................ F16D 31/02
[52] U.S. Cl. .................................... 60/436; 60/489
[58] Field of Search ............... 60/436, 399, 489, 490

[56] References Cited

U.S. PATENT DOCUMENTS

| | | |
|---|---|---|
| 1,238,927 | 9/1917 | Manly .................. 60/399 |
| 3,279,172 | 10/1966 | Kudo et al. . |
| 3,360,933 | 1/1968 | Swanson et al. . |
| 3,390,523 | 7/1968 | Heidemann et al. .......... 60/436 |
| 3,654,762 | 4/1972 | Damon .................. 60/436 |
| 3,751,924 | 8/1973 | Brown et al. . |
| 4,531,365 | 7/1985 | Wanie .................. 60/399 |
| 4,759,417 | 7/1988 | Wanie et al. ............ 60/490 |
| 4,891,943 | 1/1990 | Okada . |
| 4,903,545 | 2/1990 | Louis et al. . |
| 4,914,907 | 4/1990 | Okada . |
| 4,932,209 | 6/1990 | Okada et al. . |

FOREIGN PATENT DOCUMENTS 681546 10/1952 United Kingdom ........... 60/436

*Primary Examiner*—Edward K. Look
*Assistant Examiner*—F. Daniel Lopez
*Attorney, Agent, or Firm*—Sterne, Kessler, Goldstein & Fox

[57] ABSTRACT

A hydrostatic transmission system axle driving apparatus for changing the speed of a vehicle which includes a hydraulic pump, hydraulic motor and braking unit. Neutral valves at an open position are automatically returned to a closed position with the operation of a brake controller. This allows the vehicle to be started at slow speed, but not abruptly.

12 Claims, 10 Drawing Sheets

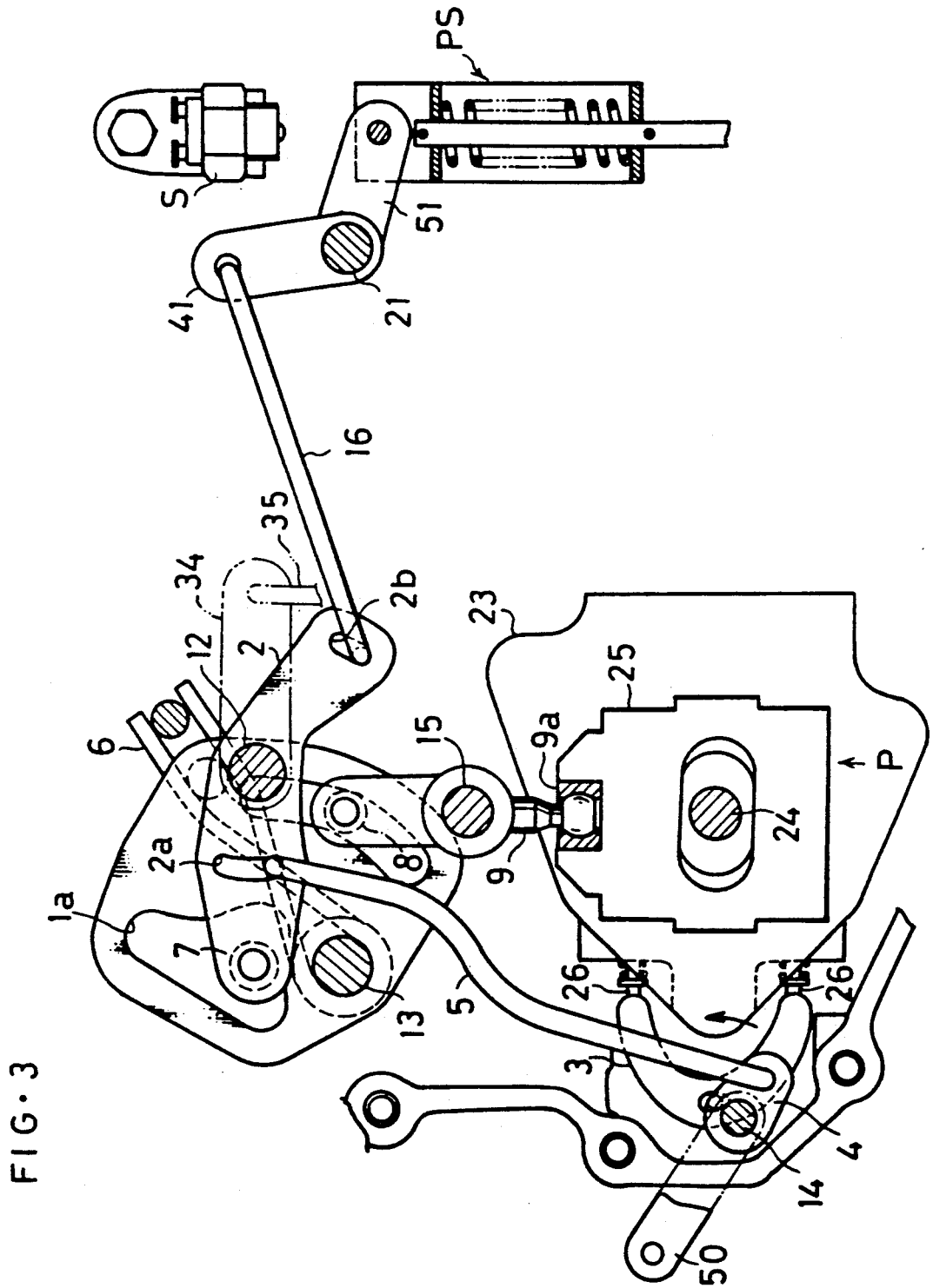
FIG·3

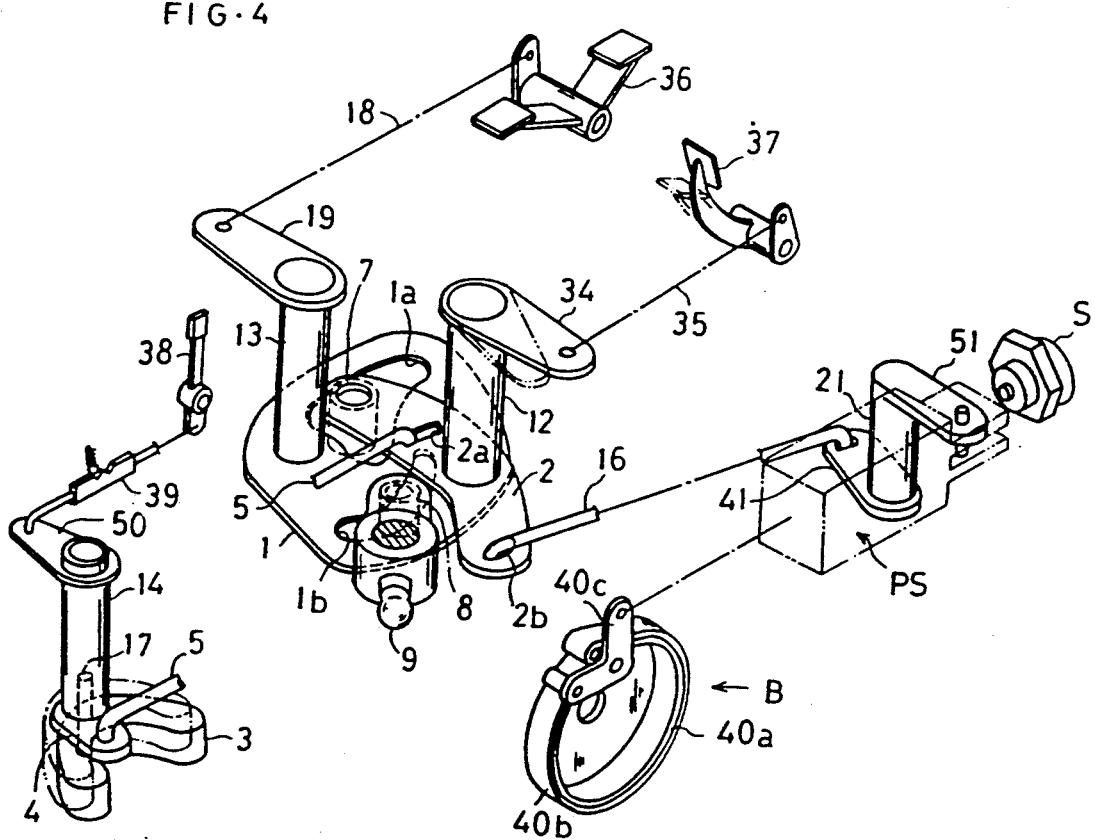

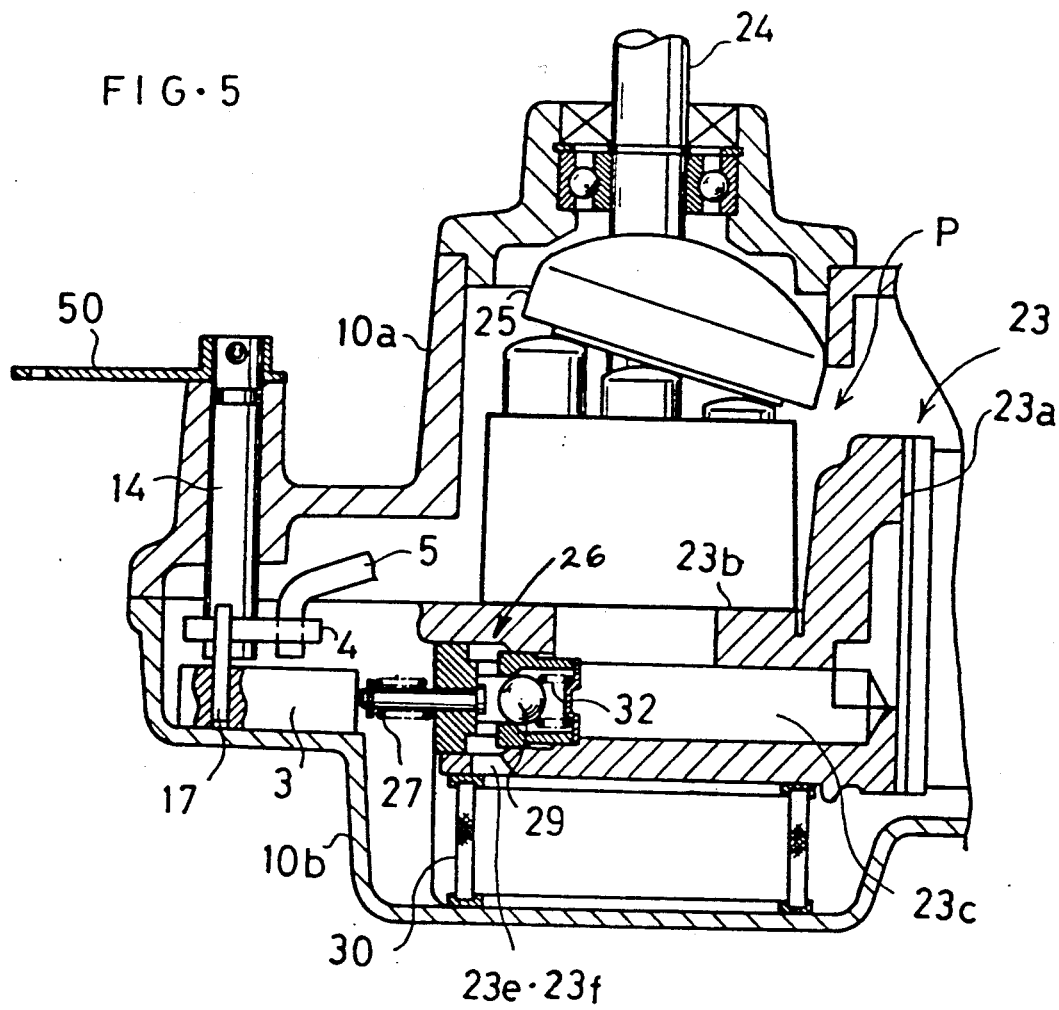
FIG·5
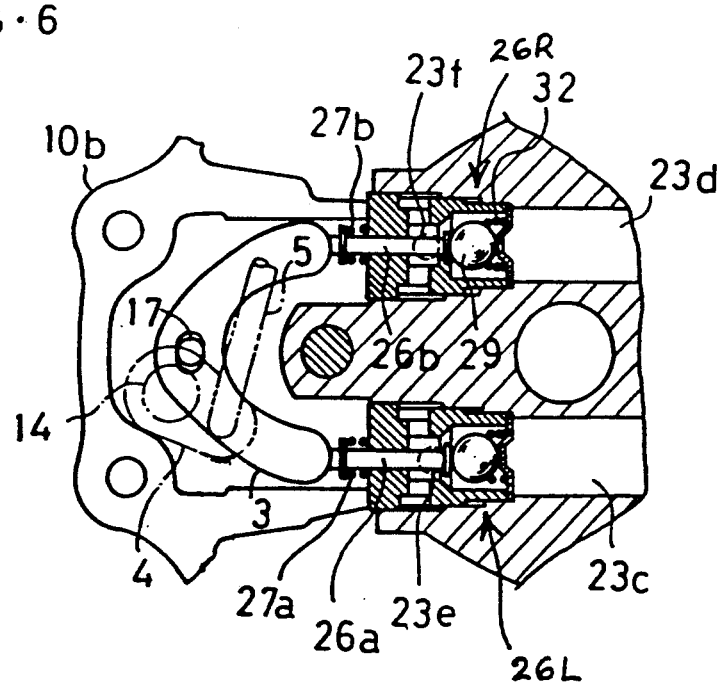
FIG·6

FIG·9
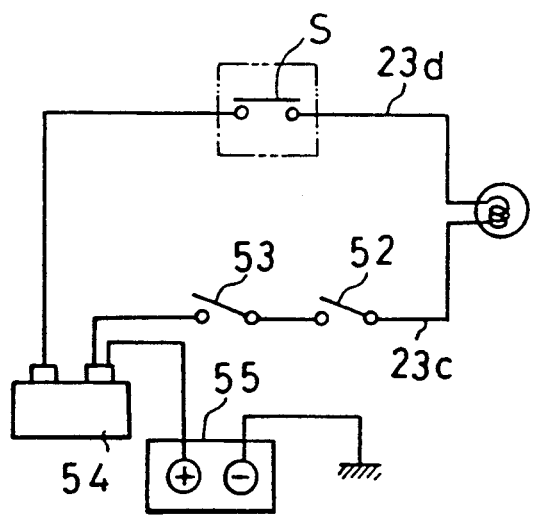
FIG·10
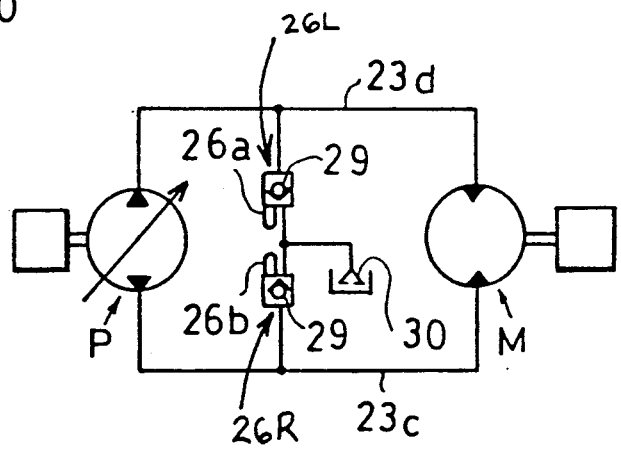
FIG·11
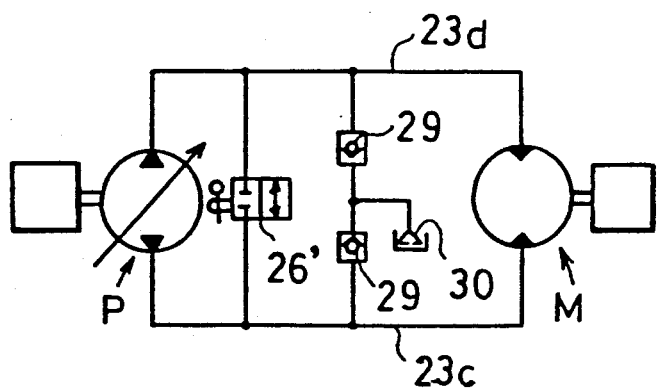

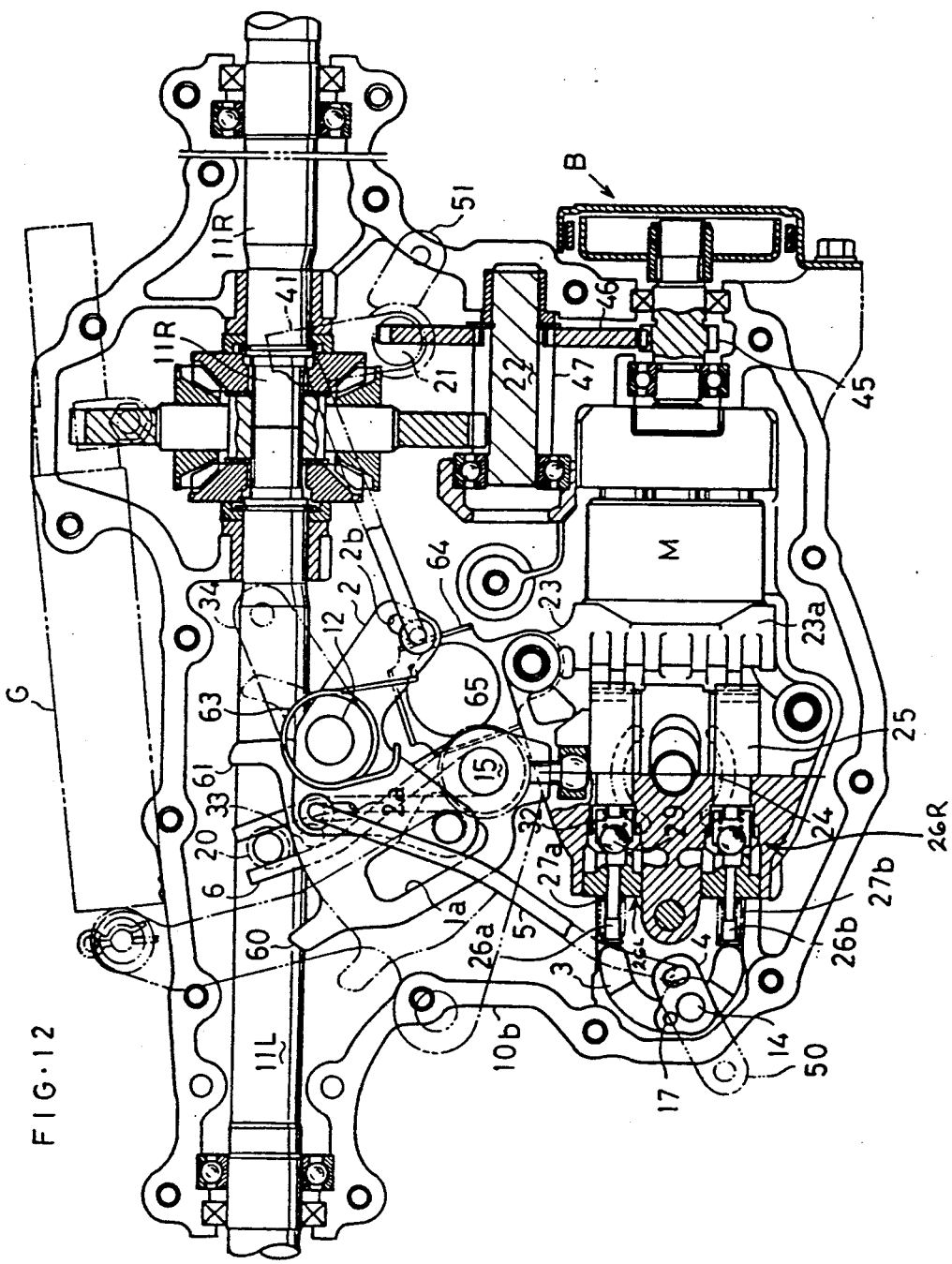

FIG·14
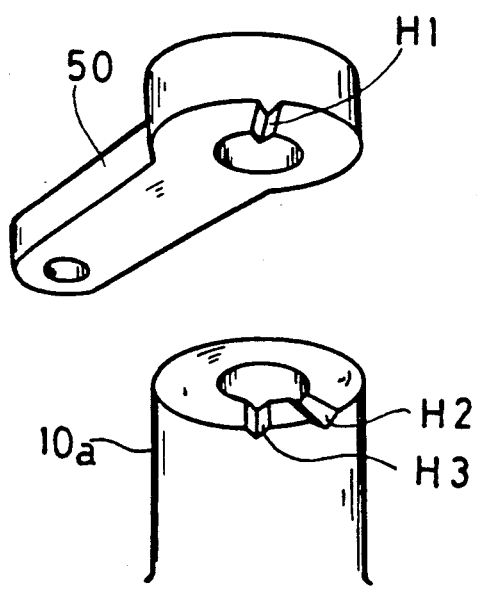

HYDROSTATIC TRANSMISSION WITH INTERCONNECTED SWASH PLATE NEUTRAL VALVE AND BRAKE UNIT

FIELD OF THE INVENTION

The present invention relates to a hydrostatic transmission (HST) system axle driving apparatus loaded on a working car for changing the speed thereof.

PRIOR ART

When the working car attached with the HST system axle driving apparatus hauls to move a car body while stopping an engine, pressure oil generated from a side of a hydraulic motor driven by axles acts to reversely drive a hydraulic pump, whereby in order not to resist traction, a neutral valve is operated to the "open" position so that oil generated from the hydraulic motor is circulated between the suction side and the discharge side thereof. Such technology is disclosed in the U.S. Pat. No. 3,360,933.

Thereafter, when the engine is restarted to be intended to usually travel, if an operator forgets to return the neutral valve to the "closed" position, the pressure oil generated by the hydraulic pump circulates only at the hydraulic pump side through the neutral valve, whereby the hydraulic motor does not rotate.

Therefore, inconvenience such that the operator misunderstands that the HST system axle driving apparatus is in trouble, is created.

Accordingly, technology of automatically returning, in association with acceleration of a speed change pedal, the neutal valve from the "open" position to the "closed" position is well-known by the Japanese Patent Laid-Open Gazette No. Sho 63-235760.

SUMMARY OF THE INVENTION

In the above-mentioned prior art, unless the speed change pedal is trod at more that a required angle, the neutral valves are not in the position "closed", thereby creating the inconvenience that starting at slow speed is impossible and that, at the moment of putting the neutral valves in the "closed" position, the car abruptly starts.

The HST system axle driving apparatus of the invention is so constructed that the neutral valves automatically return to the closed positions in association with operation of a brake controller, thereby eliminating the inconvenience when the neutral valves interlock with the speed change pedal as the above-mentioned.

BRIEF DESCRIPTION OF THE DRAWINGS

FIGS. 2 and 3 are plan views showing a speed change cam plate, a neutral valve and a braking unit in association with each other, FIG. 4 is a perspective view of an interlocking mechanism, FIG. 5 is a sectional side view of a hydraulic pump and the neutral valve in part, FIG. 6 is a plan view of the neutral valve in part, FIG. 9 is an electric circuit diagram of starting an engine, FIG. 10 is a hydraulic circuit diagram of neutral valves, FIG. 11 is an electric circuit diagram of an engine, FIG. 12 shows a second embodiment of axle driving apparatus of the invention, FIG. 14 is a perspective view of a detent constructed at part of a neutral valve operating shaft and an arm.

DESCRIPTION OF THE PREFERRED EMBODIMENT

Next, an embodiment of the invention will be described in accordance with the accompanying drawings.

Figure 1:
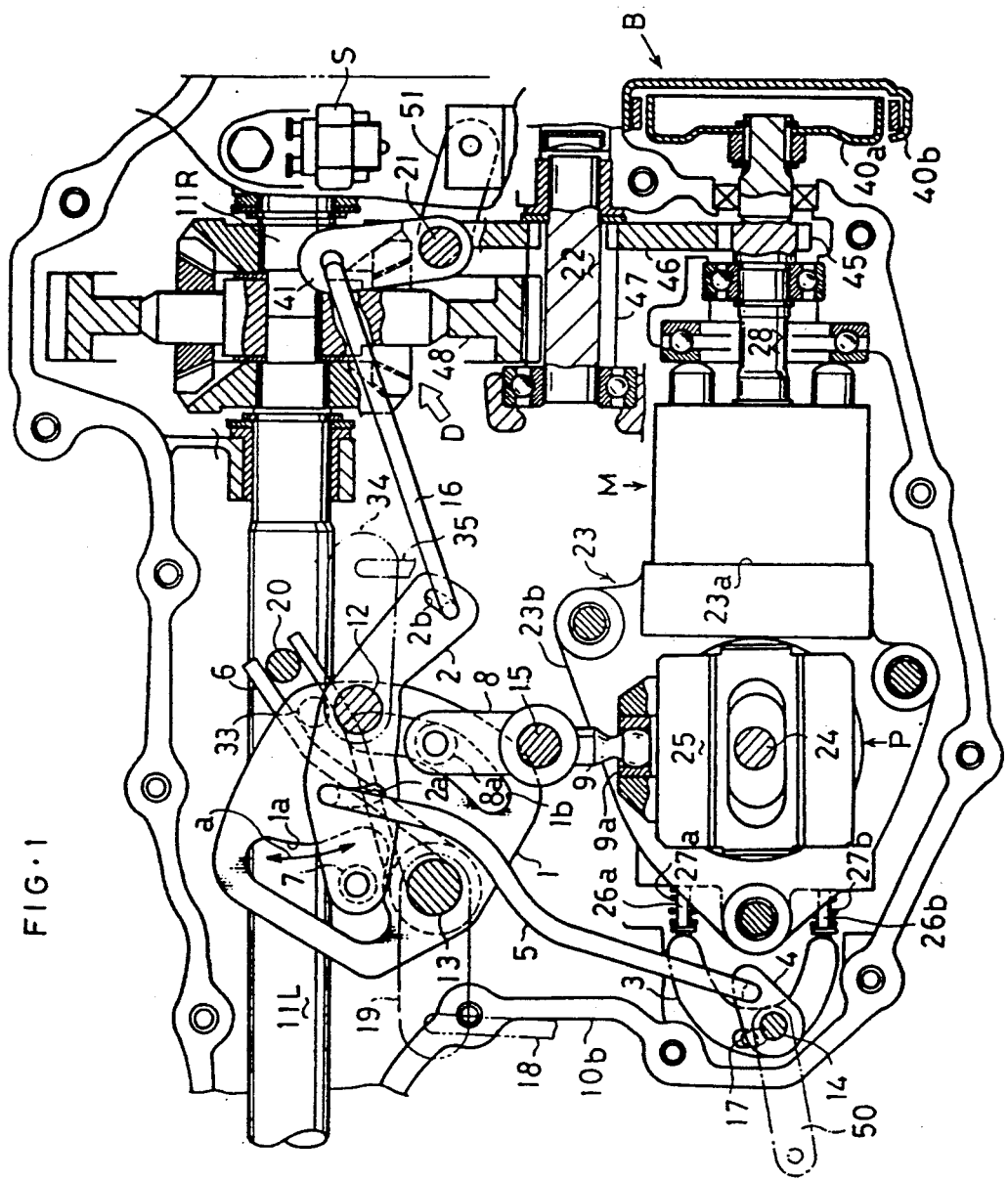
FIG. 1 is an internal plan view of a HST system axle driving apparatus applied with the present invention.

In FIGS. 1, 5 and 6, the general construction of the embodiment will be described.

The HST system axle driving apparatus of the invention is disclosed in the U.S. Pat. No. 4,914,907 as follows:

A hydraulic pump P and a hydraulic motor M, the main parts of HST system axle driving apparatus, are housed in a mission or transmission (these terms are interchangeable) case 10 vertically divided into two from the axes of axles 11L and 11R.

The hydraulic pump P extends its pump shaft 24 perpendicularly with respect to the axles 11L and 11R and is rotatably mounted on the horizontal surface 23b of a center section 23 of L-like shape in section, the hydraulic motor M extending its motor shaft 28 in parallel to the axles 11L and 11R and rotatably mounted on the vertical surface 23a of the same.

Inside the center section 23, a pair of oil passages 23c and 23d are formed for connecting a pair of kidney-shaped ports (not shown) at the hydraulic pump P and a pair of kidney-shaped ports (not shown) at the hydraulic motor M. The center section 23 is connected to an upper hald case 10a through three bolts, the case 10a and a lower half case 10b completely covering around the center section 23.

Power of an engine loaded on a working car or other vehicle (not shown) is transmitted to the pump shaft 24. The variable displacement hydraulic pump P of axial piston type is used and its swash plate 25 is rotated at a proper angle from the neutral, so that the hydraulic pump P pumps to generate pressure oil to meet an extent of its angle.

The discharged pressure oil passes through one oil passage 23c in the center section 23 so as to drive the hydraulic motor M. The pressure oil after driving the hydraulic motor M passes through the other oil passage 23d to be taken in the hydraulic pump P.

The hydraulic motor M formed in a fixed capacitance axial piston type is driven to rotate into motor shaft 28, so that power is transmitted from a gear 45 fixed to an intermediate portion thereof to a ring gear 48 at a differential gear unit D through gears 46 and 47 on a counter shaft, thereby driving the axles 11L and 11R.

Figure 8:
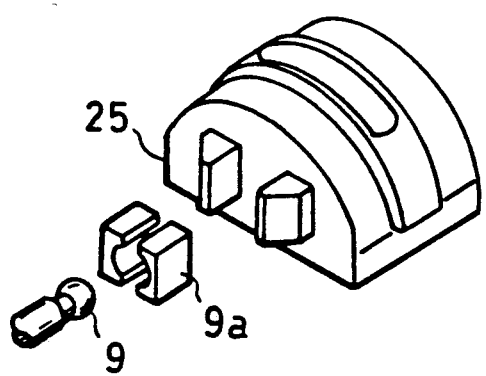
FIG. 8 is a perspective view of a rotary swash plate.

As shown in FIG. 8, the movable swash plate 25 is provided with a pair of engaging walls for rotatably operating the plate 25 and a speed change arm lever 9 is fixed therebetween through a guide 9a.

A first swash plate operating shaft 13 and a second swash plate operating shaft 15 extend vertically and pivoted to the upper half case 10a across the inside and outside thereof.

The speed change arm lever 9 is pivoted to the second swash plate operating shaft 15. On the other hand, an arm 19 integral with the first swash plate operating shaft 13 is connected to a speed change operating member 36 shows in FIG. 4.

A speed change cam plate 1 integral with the first swash plate operating shaft 13 in the mission case 10 is disposed in association with an arm 8 integral with the speed change are lever 9 through a speed change cam groove 1b and a speed change roller 8a.

The utmost end of motor shaft 28 projects outwardly of the mission case 10 and fixes a brake drum 40a. A brake show 40b is wound on the outer periphery of drum 40a and pulled by a lever 40c so as to exert the braking action to the drum 40a. A braking unit B is constructed as above-mentioned.

At the upper half case 10a, a first brake operating shaft 12 and a second brake operating shaft 21 are vertically pivoted across the inside and outside of the case.

An arm 34 integral with the first brake operating shaft 12 outside the mission case 10 is connected to a pedal as a brake operating member 37 shown in FIG. 4 through a link 35.

A brake arm 2 integral with the braking operating shaft 12 within the mission case 10 is provided at one end with an adaptable portion 2b of an elongate slot, so that a link 16 is connected at one end thereto and at the other end to an arm 41 integral with a second brake operating shaft 21 within the case. An arm 51 integral with the second brake operating shaft 21 outside the casing is connected to the level 40c through an operating force limiting spring PS.

Also, the brake arm 2 and speed change camp plate 1 are interlocked with each other through a brake interlocking cam groove 1a and a brake roller 7.

Next, explanation will be given on construction of neutral valves 26L and 26R.

The pair of oil passages 23c and 23d are disposed in parallel to each other within the center section 23 and provided at the opening ends with check valves 29 for supplying operating oil, the valves 29 being normally closed by springs 32 respectively. Between the bottom of center section 23 and that of the lower half case 10b is sandwiched a cylindrical filter 30 composed of porous material.

When the operating oil leaks from the rotary slidable surface of the hydraulic pump P or hydraulic motor M to cause negative pressure within the oil passage 23c or 23d, the check valves 29 are open against the springs 29, so that lubricating oil purified through the filter 30 within the mission case 10 flows as operating oil from a pair of suction ports 23e or 23f into the oil passage 23c or 23d at the negative pressure side, thereby compensating an amount of leakage of oil.

The two check valves 29 themselves are open into the mission case 10 artificially and simultaneously from the exterior to thereby communicate the oil passage 23c with 23d to function as the neutral valves 26L and 26R.

In other words, a pair of operating rods 26a and 26b are slidably disposed in front of the check valves 29 and adjacent to each other, and project within the mission case 10 from the exterior of the center section 23, so that a U-like-shaped urging member 3 spans across the utmost ends of the rods 26a and 26b and corresponding thereto is slidably disposed at the lower half case 10b.

On the other hand, at the upper half case 10a is provided a neutral valve operating shaft 14 extending across the interior and exterior of the case, and an arm 50 integral with the neutral valve operating shaft 14 is connected through a rod and a detent operating unit 39 to a lever shown in FIG. 4 as a neutral valve operating member 38.

In the mission case 10, a pin 17 mounted eccentrically to the neutral valve operating shaft 14 engages with the base of urging member 3, the detent operating unit 39 to be discussed below is provided for alternatively switching and holding the neutral valves 26L and 26R in the "open" position by moving forward the urging member 3 to push the pair of operating rods 26a and 26b.

The present invention is characterized in that, between the brake unit B and the neutral valves 26L and 26R, the neutral valve operating shaft 14 positioned in the lower half case 10b fixes the arm 4 and connects with one end of the rod 5, and that the adaptable portion 2a of elongate slot is provided at the brake arm 2 and the rod 5 connects at the other end thereof with the brake arm 2.

Alternatively, the other end of rod 5 may be connected through the adaptable portion to the arm 41 integral with the second brake operating shaft 21.

Next, explanation will be given on a speed change system and a brake system with reference to FIGS. 2, 3 and 4.

When the engine is operated to drive the working car, the neutral valve operating member 38 is held in the "closed" position by the detent operating lever 39.

Next, explanation will be given on operating mechanisms and linkage mechanism for the variable displacement hydraulic pump P, braking unit B, the neutral valves 26L and 26R at the HST system axle driving apparatus.

A treading force of speed change operating member 36 is transmitted to the arm 19 through the link 18, so that the first swash plate operating shaft 13 rotates through the arm 19 and the speed change cam plate 1 rotates through the shaft 13.

The speed change cam plate 1 has two grooves, the speed change cam groove 1b and the brake interlocking cam groove 1a. The speed change roller 8a pivoted to the arm 8 is fitted into the speed change cam groove 1b. The speed change lever arm 9 is smaller in rotation with respect to that of speed change cam plate 1 in the vicinity of the neutral position and larger in that at the high speed position apart from the same, thereby deciding the configuration of speed change cam grooe 1b.

When the speed change roller 8a slidably moves in the speed change cam groove 1b, the speed change lever arm 9 rotates and the swash plate 25 is rotated through the slider 9a. The hydraulic pump then discharges the proper amount to change the number of rotations of the hydraulic motor, thereby changing the car speed.

The brake roller 7 is fitted into the brake interlocking cam groove 1a and abuts against the edge thereof and is pivoted to one end of the brake arm 2.

The brake arm 2 is made rotatable by the brake operating member 37 through the link 35, arm 34 and first brake operating shaft 12.

When the brake operating member 37 is trod in order to stop the working car, the brake arm 2 rotates upwardly in the direction of the arrow a in FIG. 1 and the brake roller 7 rotatably moves in the brake interlocking cam groove 1a and along the edge thereof.

When the speed change cam plate 1 is at the neutral, the brake roller 7 rotates along the portion shown by the arrow a in the brake interlocking cam groove 1a, whereby the speed change cam plate 1 is not forcibly rotated. However, since the speed change cam plate 1 during the running is put in position other than the neutral, the brake interlocking cam groove 1a is positioned at the end thereof on the rotation path of brake roller 7, so that the brake roller 7, while slidably contacting with the edge of braking interlocking cam 1a, forcibly rotates the speed change cam plate 1 to thereby return it to the neutral.

Thereafter, the brake arm 2 pulls the link 16 through the adaptable portion 26 of elongate slot, rotates the arm 41, second brake operating shaft 21 and arm 51, and operates the lever 40c in FIG. 4 through an operating force limiting spring PS, thereby exerting the braking action on the brake drum 40a.

Figure 2:
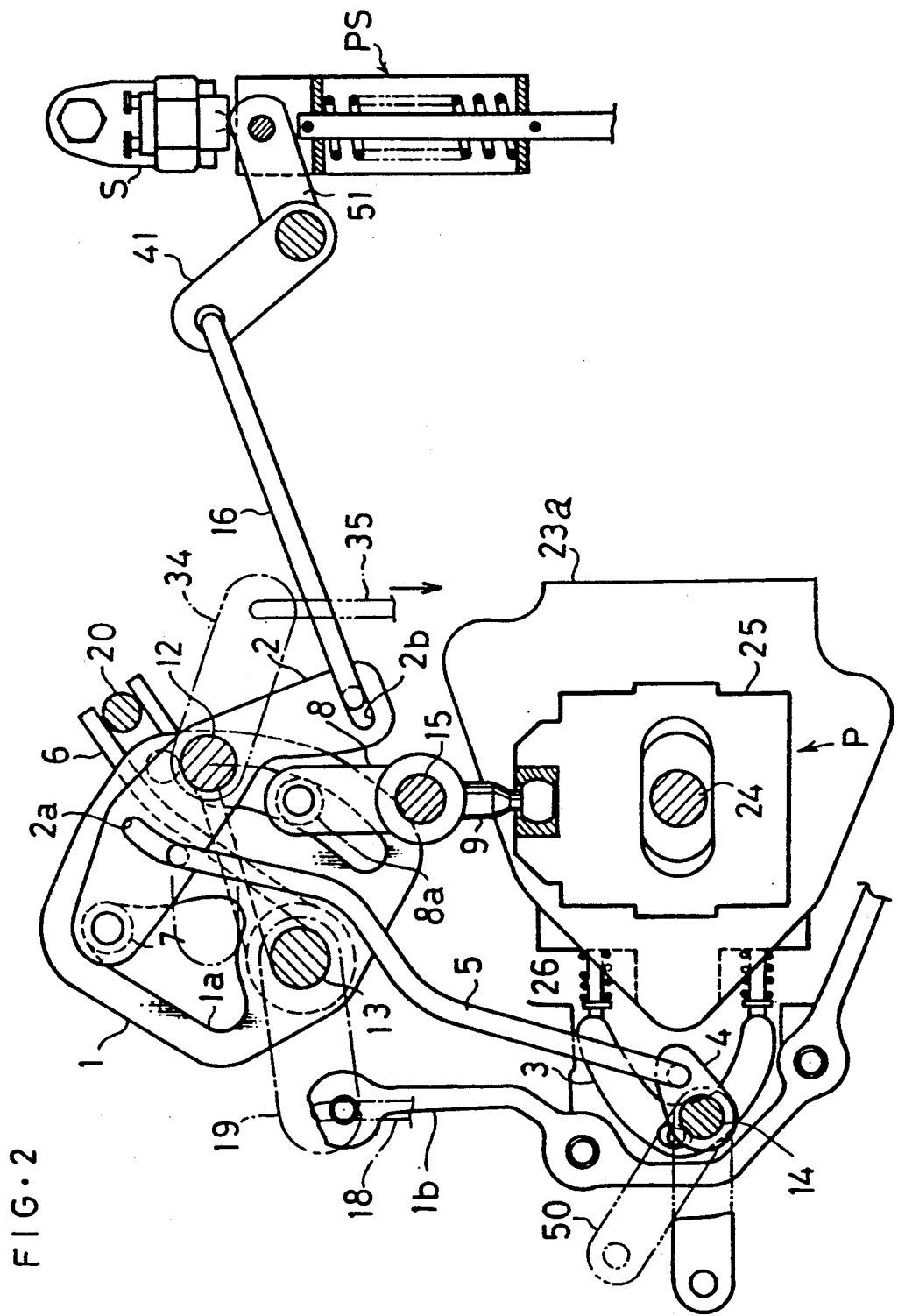
Figure 7:
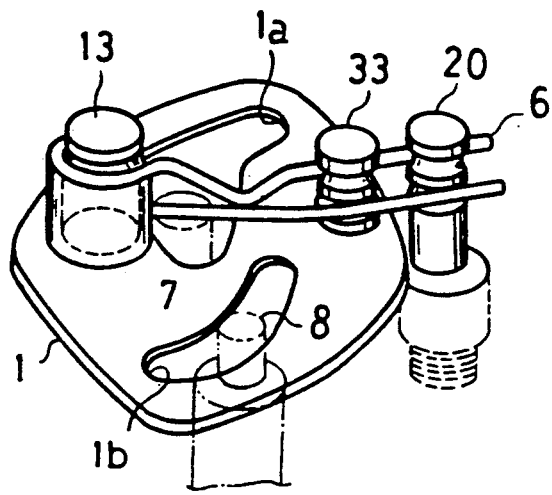
FIG. 7 is a perspective view of the speed change cam plate when viewed from the rear.

FIG. 2 shows the above-mentioned state.

At the speed change cam plate 1 is provided a biasing spring 6 for biasing the cam plate 1 to return to the neutral when the speed change operating member 36 is released from its tread, so that the biasing spring 6 applies to the speed change cam plate 1 the biasing force toward the neutral.

The biasing spring 6 is formed in a torque-spring-like shape, which is pivoted to the first swash plate operating shaft 13 and bifurcates at the utmost end. At an intermediate portion of athe biasing spring 6 is disposed a rotary pin 33 projecting from the speed change cam plate 1 and at the utmost end portion is disposed a fixed pin 20 downwardly projecting from the upper half case 10a.

In such construction, when the speed change cam plate 1 rotates, the rotary pin 33 laterally moves to open the utmost end of one leg of the bias spring 6. Since the other leg thereof is retained to the fixed pin 20, the speed change cam plate 1 is intended to return to the original neutral poosition by a restoring force of the spring 6.

As the above-mentioned, the brake arm 2 and arm 4 are connected to the rod 5 through the adaptable portion 2a.

Therefore, when the neutral valves 26L and 26R are in the "closed" position, even if the brake arm 2 rotates as the above-mentioned, it is not regulated by the other end of rod 5 to an extent of the adaptable portion 2a of elongate slot, but freely movable, whereby the rotation of brake arm 2 is not at all transmitted to the rod 5.

When the engine is stopped to haul the working car, the neutral valves 26L and 26R are switched to the "open" position as follows:

As shown in FIG. 4, the neutral valve operating member 38 is operated to rotate the neutral valve operating shaft 14 by the arm 50 through the detent unit 39.

The pin 17 eccentrically fixed to the neutral valve operating shaft 14 is displaced to move forward the urging member 3 and held in its position by the detent unit 39.

The urging member 3 pushes the operating rods 26a and 26b shown in FIGS. 5 and 6 against the biasing springs 27a and 27b so as to push the check valves 29 against the biasing springs 32, whereby a closed circuit of HST system speed change apparatus constituted of the hydraulic pump P and hydraulic motor M is open and communicate with the tank side, thus making the complete neutral state.

FIG. 6 shows the open state.

At this time, the arm 4 and neutral valve operating shaft 14 integral therewith rotate to pull the rod 5 downwardly in FIG. 6, but the other end of rod 5 and brake arm 2 are connected with each other through the adaptable portion 2a of elongate slot and during the tracking, the brake operating member 37 of course is not trod, so that the other end of rod 5 merely moves to the termination of adaptable portion 2a and a force applied to the rod 5 does not act on the brake arm 2.

Therefore, when the neutral valves 26L and 26R are switched to the "open" position, the brake unit B is not at all operated.

After the working car is hauled to a predetermined position, when the engine restarts to drive it, customarily or from construction of an engine starting electric circuit to be discussed below, the brake operating member 37 is inevitably trod and operated.

Prior to treading the brake operating member or pedal 37, the neutral valves 26L and 26R are held in the "open" position and as shown in FIG. 3 the other end of rod 5 is positioned at the termination of adaptable portion 2a of elongate slot.

Hence, when the pedal 37 is trod, the brake arm 2 rotates upwardly in FIG. 2 so as to actuate the brake unit B and upwardly pull the rod 5, so that the arm 4 is rotated from the rod 5 side in the direction of the arrow in FIG. 3. Accordingly, the urging member 3 moves backward to release the operating rods 26a and 26b, thereby automatically switching the neutral valves 26L and 26R to the "closed" position.

Also, since the neutral valve operating shaft 14 similarly rotates in the direction of the arrow, the detent unit 39 automatically holds the neutral valve operating member 38 in the "closed" position through the arm 50.

Also, a braking action switch S for detecting whether or not the brake operating member 37 operates the brake, is provided at a portion of a switching arm 51 of a brake operating system, so that, when the brake operating member 37 exerts the braking action, the switching arm 51 operates to turn "ON" the braking exerting switch S.

The braking action switch S, as shown in FIG. 9, is built in an engine starting electric circuit.

Accordingly, when the engine is intended to start, the brake operating member 37 is trod to turn "ON" the braking action switch, at which time the speed change cam plate 1 forcibly returns to the neutral, whereby a neutral detection switch 52 is turned "ON" and a key switch 53 is turned "ON" so as to close the engine starting electric circuit, thereby energizing by the battery 55 the starting motor 54.

On the other hand, the pedal 37 is trod to put the neutral valves 26L and 26R in the "closed" position through the rod 5. Therefore, the engine starting circuit is interlocked with the neutral valves 26L and 26R so that the neutral valves 26L and 26R are kept in the "closed" position.

FIG. 10 is a hydraulic circuit diagram of the embodiment described in FIGS. 1 through 9, in which the neutral valves 26L and 26R are attached to part of check valves 29, but a neutral valve 26' separate from the check valves 29 may alternatively be provided as shown in FIG. 11.

Figure 13:
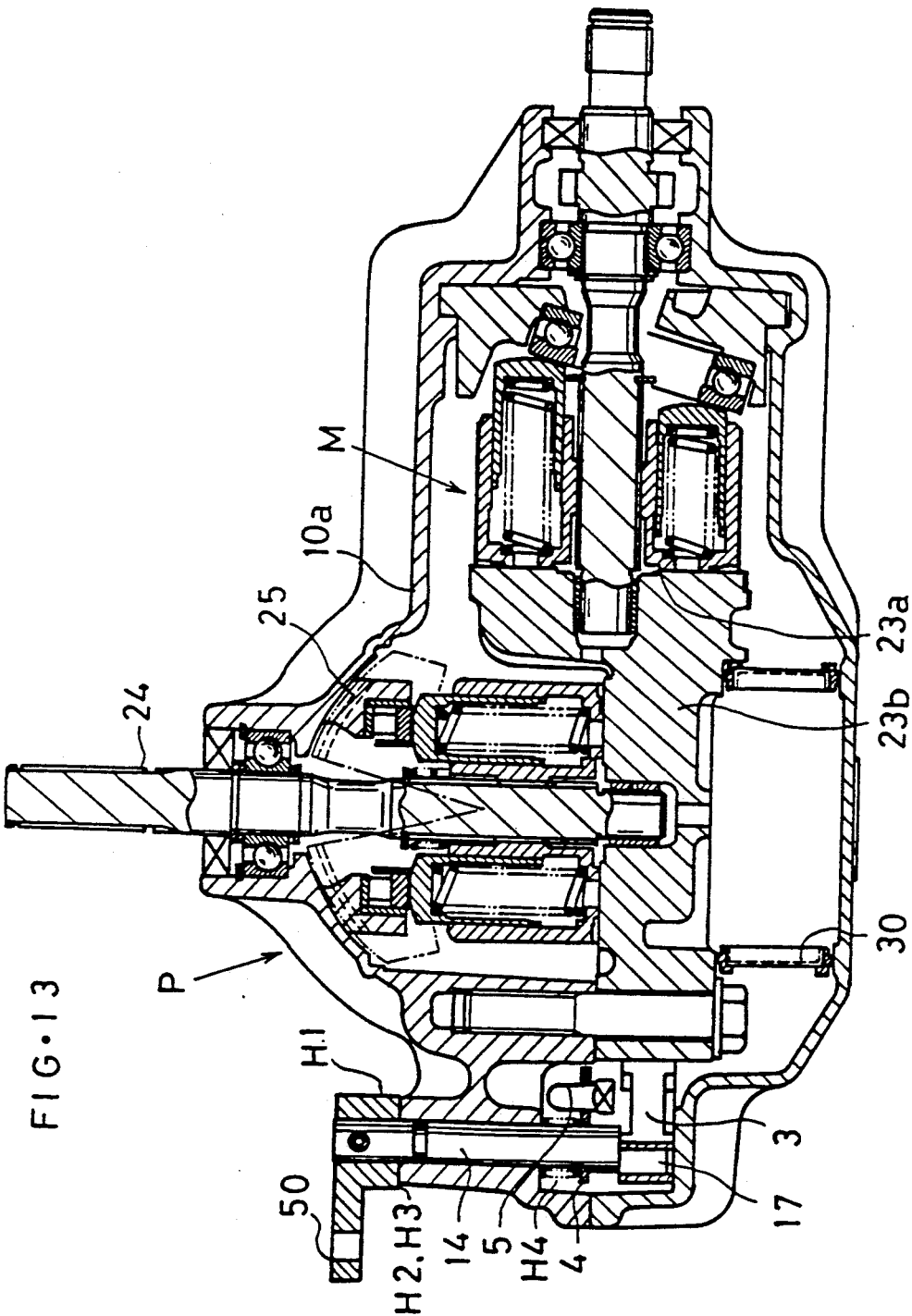
FIG. 13 is a view exemplary of other neutral valves.

Next, a second embodiment of the HST system axle driving apparatus of the invention will be described with reference to FIGS. 12, 13 and 14.

In the drawings, the same reference numerals as those in the first embodiment designate the same or corresponding components, which are omitted of description.

The components added to or varied from the first embodiment are as follows:

A speed change arm lever 9 fitted into a swash plate 25 through a guide 9a is directly fixed to one swash plate operating shaft 15 vertically extending and rotatably pivoted to an upper half case 10a across the exterior and interior thereof. On the other hand, the swash plate operating shaft 15 projecting outwardly from the mission case 10 fixes an arm 19 linked with a speed change member 36, the arm 19 being connected to an operating end of a shock absorber G.

A speed change cam plate 1 is integral with the speed change arm lever 9 itself, and a pair of stopper pawls 60 and 61 for regulating a rotation angle of a swash plate 25 in the forward and backward moving directions are provided. When the speed change cam plate 1 rotates and the pawl 60 or 61 abuts against the fixing pin 20, the cam plate 1 is restricted of its further rotation.

A coiled torque spring 63 is wound between the brake arm 2 and the upper half case 10a, thereby biasing the brake arm normally in the not-operating direction.

At the bottom of a center section 23 connected to the inside of upper half case 10a by three bolts, one bolt is tightened to fix a pan 64 of iron to the bottom and a magnet 65 is placed on the pan 64, thereby absorbing iron powder suspending in lubricating and operating oil in the mission case 10.

A detent unit 39 is formed at the upper half case 10a side.

In other words, as shown in FIG. 14, at the rear surface of an arm 50 on a neutral valve operating shaft 14 is formed a projection $H_1$, and at the surface of upper half case 10a opposite to the arm 50 are formed grooves $H_2$ $H_3$ at two portions corresponding to the "open" position and "closed" position of neutral valves 26L and 26R, so that the projection $H_1$ engages with the groove $H_2$ or $H_3$ and the neutral valve 26L or 26R is switched in position and held thereto.

A coiled compression spring $H_4$ is provided between the arm 4 and the upper half case 10a so as to downwardly bias the arm 50 to reliably engage the projection $H_1$ with the groove $H_2$ or $H_3$.

The brake unit B is linked with the travel valves 26L and 26R in such a manner that the rod 5 is mechanically linked between the arm 2 at the brake operating shaft 12 and the arm 4 at the neutral valve operating shaft 14 through the adaptable portion 2a, whereby the axle driving apparatus of the invention can be constructed simply and at the low manufacturing cost.

The brake operating member should be once trod when the engine starts, at which time, even without operating the neutral valve operating member 38, the neutral valve 26L and 26R, only when positioned at "open", can automatically be returned to the "closed" position.

The U-like-shaped urging member 3 engageable with the pin 17 eccentrically mounted to the neutral valve operating shaft 14 is moved forwardly so as to simultaneously operate the pair of neutral valve 26L and 26R to the "open" positions respectively, thereby enabling the apparatus to be constructed simple and at the low manufacturing cost.

Linkage between the brake unit B and the neutral valves 26L and 26R is simply and inexpensively obtained by mechanically linking the rod 5 between the arm 2 at the brake operating shaft 12 and the arm 4 at the neutral valve operating shaft 14 through the adaptable portion 2a, and the link mechanism is disposed in the mission case, thereby avoiding operation failure caused by rust or a foreign object entering.

The brake operating pedal should be once trod when the engine starts, at which time, even without operating the neutral valve operating member 38, the neutral valves 26L and 26R, only when positioned at "open", can automatically be returned to the "closed" position.

The pair of neutral valves 26L and 26R are simultaneously operated to the "open" position by forwardly moving the U-like-shaped urging member 3 engageable with the pin 17 eccentrically mounted to the neutral valve operating shaft 14, thereby enabling the apparatus to be constructed simply and inexpensively.

The pin 17 and urging member 3 are disposed in the mission case 10 and engage with each other, thereby eliminating operation failure caused by rust or a foreign object entering.

When the neutral valves 26L and 26R are kept held in the "open" position, the hydraulic motor is not driven, so that, in order to start the engine after tracking and to drive the car, the brake operating pedal 37 is once trod, whereby the neutral valves 26L and 26R can automatically be returned to the "closed" position without operating the neutral valve operating member 38.

At this time, the variable displacement hydraulic pump P also can automatically be returned to the neutral even without operating the speed change pedal 36.

Thereafter, the operator need only operate the speed change pedal 36 for increasing the speed, whereby the slow speed start is possible and there is no inconvenience that the car body abruptly starts.

Linkage between the brake unit B, neutral valves 26L and 26R, and swash plate for the hydraulic pump P, is mechanically formed, thereby enabling the apparatus to be constructed simply and inexpensively.

When the engine starts, the brake operating pedal should be once trod, at which time the neutral valves 26L and 26R, only when positioned at "open", can automatically be returned to the "closed" position even without operating the neutral valve operating member 38.

The pair of neutral valve 26L and 26R are simultaneously operated to the "closed" position by forwardly moving the U-like-shaped urging member 3 engageable with the pin 17 eccentrically mounted to the neutral valve operating shaft 14, thereby enabling the apparatus to be constructed simply and inexpensively.

What is claimed is:

1. A hydrostatic transmission system axle driving apparatus which connects a hydraulic pump in association with an engine and a hydraulic motor in association with axles by a pair of oil passages, comprising:

neutral valves, which are capable of switching said oil passage at the high pressure side to the "open" position communicating with said oil passage at the low pressure side and to the "closed" position cutting off said communication with said oil passage, at a center section;

a neutral valve operating member which alternatively switches the positions of said neutral valves through a detent unit, thereby enabling said positions to be held; and a braking unit on a power transmission route extending from said hydraulic motor to said axles, wherein said braking unit and said neutral valves are linked such that when said braking unit is actuated by a brake operating member, said neutral valves, only when held to the "open" positions, are released to be switched to the "closed" position.

2. A hydrostatic transmission system axle driving apparatus according to claim 1, further comprising:
a neutral valve operating shaft for linking therethrough said neutral valve operating member and said neutral valves;
and a brake operating shaft for linking therethrough said brake operating member and said braking unit,
wherein said neutral valve operating shaft and said brake operating shaft are pivoted with respect to a frame, and a rod is connected between an arm provided at said brake operating shaft and an arm provided at said neutral valve operating shaft through an adaptable portion.

3. A hydrostatic transmission system axle driving apparatus according to claim 2, further comprising:
a pair of operating rods for said neutral valves disposed adjacent to each other and projecting outwardly from said center section;
a U-like-shaped urging member abutting against the utmost ends of said pair of operating rods in a bridging manner; and
a pin eccentrically mounted to said neutral valve operating shaft which engages with the base of said urging member,
wherein said neutral valve operating shaft is rotatably operated to displace the engaging position of said pin and forwardly move said urging member to simultaneously push said operating rods, thereby switching said neutral valves to the "open" position.

4. A hydrostatic transmission type axle driving apparatus according to claim 1, further comprising:
a brake exerting switch for detecting the state where said braking unit operates,
wherein said brake exerting switch is on an operation route extending from said brake operating member to said braking unit, said brake exerting switch being interposed in an engine starting electric circuit in order to enable said engine to start only when the brake operating state is detected.

5. A hydrostatic transmission system axle driving apparatus which connects a hydraulic pump in association with an engine and a hydraulic motor in association with axles by a pair of oil passages formed at a center section, wherein said hydraulic pump, said hydraulic motor, and said center section are housed in a transmission case, comprising:
neutral valves, capable of switching said oil passage at the high pressure side to the "open" position communicating with said oil passage at the low pressure side and to the "closed" position to cut off said communication with said oil passage, at said center section housed in a transmission case;
a neutral valve operating member which alternatively switches said neutral valves in position through a detent unit, thereby enabling said positions to be held; and
a braking unit on a power transmission route extending from said hydraulic motor to said axles,
wherein said braking unit and said neutral valves are linked with each other such that said neutral valves, only when held in the "open" position, are released to be switched to the "closed" position.

6. A hydrostatic transmission system axle driving apparatus according to claim 5, further comprising:
a neutral valve operating shaft for linking said neutral valve operating member and said neutral valves; and
a brake operating shaft for linking a brake operating member and said braking unit,
wherein said neutral valve operating shaft and said brake operating shaft are pivoted to said transmission case across the inside and outside thereof, and arms are provided at said brake operating shaft and said neutral valve operating shaft position in said transmission case respectively, so that a rod is connected between both said arms through an adaptable portion.

7. A hydrostatic transmission system axle driving apparatus according to claim 6, further comprising:
a pair of operating rods for said neutral valves disposed adjacent to each other and projecting outwardly from said center section and inwardly of said transmission case;
a U-like-shaped urging member abutting against the utmost ends of said pair of operating rods in a bridging manner, guided into said transmission case and supported thereto; and
a pin eccentrically mounted to said neutral valve operating shaft which engages with the base of said urging member,
wherein said neutral valve operating shaft is rotatably operated to displace the engaging position of said pin, forwardly move said urging member, and simultaneously push said operating rods, thereby switching said neutral valves to the "open" positions respectively.

8. A hydrostatic transmission system axle driving apparatus according to claim 5, further comprising:
a brake exerting switch for detecting the state where said braking unit operates,
wherein said brake exerting switch is on an operating route from a brake operating member, said brake exerting switch being interposed in an engine starting electric circuit in order to enable said engine to start only when the brake operating state is detected.

9. A hydrostatic transmission system axle driving apparatus which connects a variable displacement hydraulic pump in association with an engine and a hydraulic motor in association with axles by use of a pair of oil passages, comprising:
neutral valves, capable of switching said oil passage at the high pressure side to the "open" position for communicating with said oil passage at the low pressure side and to the "closed" position cutting off said communication with said oil passage at the low pressure side, at a center section;
a neutral valve operating member which alternatively switches said neutral valves in position so as to make said positions holdable;
a swash plate of said variable displacement hydraulic pump constituted to be variable of an angle of said swash plate by a speed change operating member; and
a braking unit,
wherein said variable displacement hydraulic pump, and said neutral valves, are so linked that, when said brake unit provided on a power transmission route from said hydraulic motor to said axles is actuated by a brake operating member, said swash plate is returned to the neutral, and simultaneously said neutral valves, only when held in the "open" position, are released to be switched to the "closed" position.

10. A hydrostatic transmission system axle driving apparatus according to claim 9, further comprising:
a swash plate operating shaft for linking said speed change operating member and said movable swash plate;

a neutral valve operating shaft for linking said neutral valve operating member and said neutral valves; and a brake operating shaft for linking said brake operating member and said braking unit, wherein said neutral valve operating shaft and said brake operating shaft are rotatably pivoted to a frame respectively, so that an arm provided at said swash plate operating shaft and an arm provided at said brake operating shaft engage with each other and a rod is connected between said arm at said brake operating shaft and an arm provided at said neutral valve operating shaft through an adaptable portion.

11. A hydrostatic transmission system axle driving apparatus according to claim 10, further comprising:

a pair of operating rods for said neutral valves disposed adjacent to each other and projecting outwardly from a center section;

a U-like-shaped urging member abutting against the utmost ends of said pair of operating rods in a bridging manner; and a pin eccentrically mounted to said neutral valve operating shaft which engages with the base of said urging member, wherein said neutral valve operating shaft is rotatably operated to displace said pin in its engaging position, forwardly move said urging member, and simultaneously push said operating rods, thereby switching said neutral valves to the "open" positions respectively.

12. A hydrostatic transmission system axle driving apparatus according to claim 9, further comprising:

a brake exerting switch for detecting the state where said braking unit operates, wherein said brake exerting switch is on an operation route from said brake operating member to said braking unit, said brake exerting switch being interposed in an engine starting electric circuit so as to enable said engine to start only when the brake operating state is detected.

* * * * *